(12) United States Patent
Reynolds et al.

(10) Patent No.: US 8,658,940 B2
(45) Date of Patent: Feb. 25, 2014

(54) REMOTELY CONTROLLED WELDING MACHINE

(71) Applicant: Illinois Tool Works Inc., Glenview, IL (US)

(72) Inventors: Jon O. Reynolds, Appleton, WI (US); Bruce Patrick Albrecht, Neenah, WI (US); Eric Young, Greenville, WI (US); Michael W. Hogan, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 13/942,352

(22) Filed: Jul. 15, 2013

(65) Prior Publication Data

US 2013/0299477 A1    Nov. 14, 2013

Related U.S. Application Data

(63) Continuation of application No. 11/275,077, filed on Dec. 8, 2005, now Pat. No. 8,487,216, which is a continuation of application No. 10/604,482, filed on Jul. 24, 2003, now Pat. No. 7,205,503.

(51) Int. Cl.
    *B23K 9/10*    (2006.01)

(52) U.S. Cl.
    USPC .................... 219/132; 219/130.21; 219/130.5

(58) Field of Classification Search
    USPC ................................. 219/132, 130.21, 130.5
    See application file for complete search history.

(56) References Cited

U.S. PATENT DOCUMENTS

| | | | |
|---|---|---|---|
| 2,043,331 A | 6/1936 | Notvest | |
| 2,175,891 A | 10/1939 | Graham | |
| 2,526,597 A | 10/1950 | Winslow | |
| 2,642,515 A | 6/1953 | Bagg | |
| 3,496,328 A | 2/1970 | Moerke | |
| 3,992,565 A | 11/1976 | Gatfield | |
| 4,051,344 A | 9/1977 | Robbins | |
| 4,216,367 A | 8/1980 | Risberg | |
| 4,216,368 A | 8/1980 | Delay | |
| 4,227,066 A | 10/1980 | Bulwidas, Jr. | |
| 4,247,752 A | 1/1981 | Stringer | |
| 4,266,114 A | 5/1981 | Hansen | |
| 4,410,789 A | 10/1983 | Story | |
| 4,467,174 A | 8/1984 | Gilliland | |
| 4,508,954 A | 4/1985 | Kroll | |
| 4,521,672 A | 6/1985 | Fronius | |
| 4,531,045 A | 7/1985 | Kemp | |

(Continued)

FOREIGN PATENT DOCUMENTS

| | | |
|---|---|---|
| EP | 0575082 A2 | 12/1993 |
| JP | 61137675 A | 6/1986 |

(Continued)

*Primary Examiner* — Brian Jennison
(74) *Attorney, Agent, or Firm* — Fletcher Yoder P.C.

(57) ABSTRACT

The present invention is directed to a remotely controlled welding machine. A remote control uses the welding circuit to transfer information to a welding power source. The information to be communicated to the power source includes welding power source output command information (amperage/voltage control), welding circuit on/off information (power source output contactor control), and power source mode control (constant voltage/constant current). A transmitter transmits the desired welding operational parameters to a receiver disposed in the power source. The transmitter is constructed to use only a small amount of power which, preferably, is supplied by one or two low voltage replaceable and/or rechargeable batteries. Additionally, an open circuit voltage is not created between the power source and an electrode holder when an arc is not present.

20 Claims, 5 Drawing Sheets

(56) References Cited

U.S. PATENT DOCUMENTS

| | | | |
|---|---|---|---|
| 4,561,059 A | 12/1985 | Davis et al. | |
| 4,608,482 A | 8/1986 | Cox et al. | |
| 4,641,292 A | 2/1987 | Tunnell et al. | |
| 4,767,908 A | 8/1988 | Dallawalle et al. | |
| 5,039,835 A | 8/1991 | Schwiete | |
| 5,043,557 A | 8/1991 | Tabata et al. | |
| 5,063,282 A | 11/1991 | Gilliland | |
| 5,276,305 A | 1/1994 | Hsien | |
| 5,406,050 A | 4/1995 | Macomber et al. | |
| 6,040,555 A | 3/2000 | Tiller et al. | |
| 6,103,994 A | 8/2000 | DeCoster et al. | |
| 6,114,657 A | 9/2000 | Hayes et al. | |
| 6,156,999 A | 12/2000 | Ignatchenko et al. | |
| 6,570,132 B1 | 5/2003 | Brunner et al. | |
| 6,624,388 B1 | 9/2003 | Blankenship et al. | |
| 6,781,095 B2 | 8/2004 | Hayes et al. | |
| 6,906,285 B2 | 6/2005 | Zucker et al. | |
| 6,909,285 B2 | 6/2005 | Jordan et al. | |

FOREIGN PATENT DOCUMENTS

| | | |
|---|---|---|
| JP | 4162964 A | 6/1992 |
| JP | 4162966 A | 6/1992 |
| JP | 05104248 A | 4/1993 |
| JP | 2003154455 A | 5/2003 |
| JP | 2003191075 A | 7/2003 |

REMOTELY CONTROLLED WELDING MACHINE

CROSS REFERENCE TO RELATED APPLICATION

The present invention is a continuation and claims priority of U.S. patent application Ser. No. 11/275,077 filed Dec. 8, 2005, which is a continuation and claims priority of U.S. patent application Ser. No. 10/604,482 filed Jul. 24, 2003, the disclosures of which are incorporated herein.

BACKGROUND OF THE INVENTION

The present invention relates generally to welding machines and, more particularly, to a method and apparatus of communicating control signals to a welding power source from a remote location. Specifically, the invention relates to a power source whose operation is governed by control signals provided by a controller in response to command signals received across the weld cables connecting a wire feeder to the power source. In this regard, a voltage potential is not created between the secondary output of the power source and the wire feeder until a power-up command is transmitted to the receiver across the weld cables by the transmitter.

MIG welding, formerly known as Gas Metal Arc Welding (GMAW), combines the techniques and advantages of TIG welding's inert gas shielding with a continuous, consumable wire electrode. An electrical arc is created between the continuous, consumable wire electrode and a workpiece. As such, the consumable wire functions as the electrode in the weld circuit as well as the source of filler metal. MIG welding is a relatively simple process that allows an operator to concentrate on arc control. MIG welding may be used to weld most commercial metals and alloys including steel, aluminum, and stainless steel. Moreover, the travel speed and the deposition rates in MIG welding may be much higher than those typically associated with either Gas Tungsten Arc Welding (TIG) or Shielded Metal Arc Welding (stick) thereby making MIG welding a more efficient welding process. Additionally, by continuously feeding the consumable wire to the weld, electrode changing is minimized and as such, weld effects caused by interruptions in the welding process are reduced. The MIG welding process also produces very little or no slag, the arc and weld pool are clearly visible during welding, and post-weld clean-up is typically minimized. Another advantage of MIG welding is that it can be done in most positions which can be an asset for manufacturing and repair work where vertical or overhead welding may be required.

A wire feeder is operationally connected to the power source and is designed to deliver consumable wire to a weld. To further enhance the operability of the wire feeder of a MIG welding system, known welding systems have connected the power source and the wire feeder to one another such that control signals defining the operational parameters of the power source are transmitted or fed back from the wire feeder to the power source, generally referred to as remote control.

One type of remote control device is used to regulate the output voltage, current, and switch the welding power source output ON and OFF as well as change the power source mode via a pendant that connects to the power source by a multi-conductor cable. The solution is schematically illustrated in FIG. 1A. A wire feeder 2A is connected to a power source 4A by a control cable 6A that includes a 14-pin connector. The cable 6A used to transmit operational information to, and in some cases from the power source, may incorporate 2 to 14 conductors depending on how many functions are to be controlled. Separately connected between the power source 4A and wire feeder 2A is a high voltage weld cable 8A that delivers power to the wire feeder and creates a voltage potential between an electrode and a workpiece.

A significant drawback to this cable-based control is that the control cable is typically fragile relative to the welding cables designed to carry high currents at high voltages. Welding machines are commonly used at construction sites or shipyards where it is not uncommon for the welding machines to be periodically relocated or surrounded by other mobile heavy equipment operating in the same area. As such, the remote control cable can become damaged by being crushed or snagged from contact with surrounding machines and/or traffic. This can cause damage to the wire feeder and/or the welding power source if internal power conductors become shorted to signal leads that are connected to sensitive signal level circuitry.

One known system is a voltage following or voltage sensed wire feeder having an internal contactor. This solution is schematically shown in FIG. 1B. As shown, this system includes a wire feeder 2B that receives its electrical power from the voltage present in the welding circuit. The wire feeder is connected to a power source 4B via a weld cable 8B. With this system, the operator sets a desired welding current at the power source 4B and the wire feeder 2B regulates the arc voltage by increasing the rate wire feed is fed if the arc voltage increases and reduces the wire feed rate if the arc voltage decreases in order to maintain a constant arc voltage. One disadvantage of this system is that the operator has no convenient way to adjust the output of the welding power source to compensate for changes in workpiece thickness and/or fit up. The operator may call another person more conveniently located to the power source with a radio or some other means of communication to make the adjustment; however, if the operator is working alone, s/he must return to the power source to make the necessary adjustments. Another disadvantage of this system is that it requires the presence of a high current DC contactor to de-energize the welding circuit at the wire feeder. These contactors are large, heavy, costly, and require periodic maintenance to ensure proper and continual operation. The location of the secondary contactor in the remotely located wire feeder also requires that the welding circuit from the welding power source to the wire feeder remain energized even when not welding so that power is available to the wire feeder and welding arc when the gun trigger is activated. Accordingly, an open circuit voltage remains present across the weld cables. The weld cables, however, can become damaged at a worksite resulting in an unwanted arc being formed between an exposed portion of the cable and an unexpectant ground.

Referring now to FIG. 1C, another remote controlled system includes a radio transmitter type remote control. This approach has several disadvantages. First, electric arc welding can create radio frequency interference that negatively affects the communication between a transceiver 9A of the wire feeder 2C and the transceiver 9B of the power source 4C. Second, if the system is used inside metal structures such as tanks, ships, or large aircraft, the radio link can be lost due to the shielding effect of the metallic surroundings. Third, if multiple welding stations use a radio link for remote control, each control loop would require a separate security code to prevent cross-talk or mis-transmission of control signals to the wrong welding machine.

It is therefore desirable to design a remotely controlled welding machine that receives command signals from a wire feeder across a weld cables such that an open circuit voltage is not created between the secondary output of a power source and the wire feeder when the wire feeder is not supplying consumable wire to a weld. It would also be desirable to design a wire feeder absent a separate contactor assembly.

BRIEF DESCRIPTION OF THE INVENTION

The present invention is directed to a remotely controlled welding machine that overcomes the aforementioned drawbacks. A remote control uses the welding circuit to transfer information to a welding power source. The information to be communicated to the power source includes welding power source output command information (amperage/voltage control), welding circuit on/off information (power source output contactor control), and power source mode control (constant voltage/constant current). A transmitter transmits the desired welding operational parameters to a receiver disposed in the power source. The transmitter is constructed to use only a small amount of power which, preferably, is supplied by one or two low voltage replaceable and/or rechargeable batteries. Additionally, an open circuit voltage is not created between the power source and an electrode holder when an arc is not present.

Therefore, in accordance with one aspect of the present invention, a welding system includes a power source having a controller to regulate welding operation. An electrode holder having a trigger is configured to hold an electrode in relative proximity to a workpiece such that a welding arc is created between the electrode and the workpiece. The system also includes a transmitter configured to detect activation of the trigger and, responsive thereto, transmit a signal indicative of desired welding operation through weld cables. A receiver is provided remotely from the transmitter and is configured to receive the signal and instruct the controller of the power source according to the desired welding operation.

In accordance with another aspect of the present invention, a welding system includes a power source configured to condition raw power and supply a power usable during a welding process. A wire feeder is configured to receive the power from the power source and supply a consumable electrode to a weld. The wire feeder includes a torch connected thereto and a transmitter configured to detect activation of the torch and transmit a signal to a receiver of the power source indicating activation of the torch. The welding system further includes a welding cable connecting the power source and the wire feeder to one another such that the signal is transmittable thereacross from the transmitter to the receiver. The system is constructed such that a voltage is not created across the weld cable until the transmitter transmits a signal to the receiver signaling that the torch has been activated.

According to another aspect of the present invention, a method of remotely controlling a power source for a welder includes the step of detecting activation of a triggering mechanism of a welding-type torch to initiate a welding-type process. The method further includes the step of transmitting a signal indicative of desired operational parameters of the power source through weld cables connected to the power source and a workpiece, automatically upon activation of the triggering mechanism. The transmitted signal is then received remotely from the triggering mechanism whereupon the power source is controlled in accordance with data embodied in the signal transmitted through the weld cables.

In accordance with yet a further aspect of the present invention, a kit to retrofit a welder and wire feeder system is provided. The kit includes a transmitter to be disposed within a wire feeder and configured to detect activation of a welding torch. The kit also includes a receiver to be disposed within a power source and electrically connected to the transmitter through the weld cables. A controller is provided to regulate operation of the power source such than an open circuit voltage is not created across the weld cables until an energized secondary voltage command signal is received by the receiver from the transmitter.

Various other features, objects and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

The present invention will be described with respect to regulation of a power source and wire feeder of a MIG welding system based on feedback provided from a transmitter remote from the power source to a receiver incorporated within the power source. However, the present invention is equivalently applicable with regulating power sources of TIG, stick, flux cored, and the like welding systems. Moreover, the present invention is also applicable with non-welding, high power systems such as plasma cutters and induction heaters.

Figure 1A:
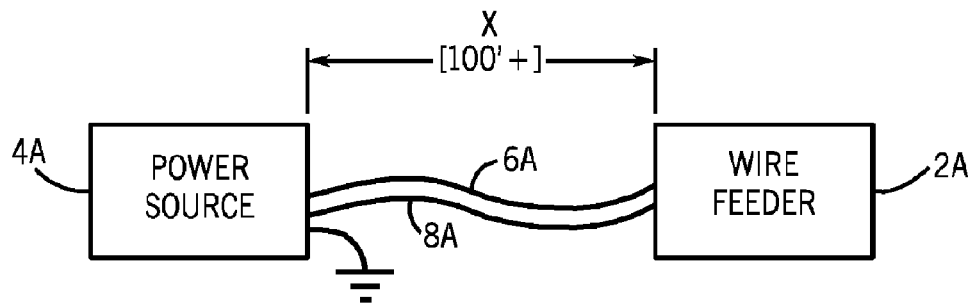
FIGS. 1A-1C are schematic block diagrams illustrating examples of known remotely controlled welding and wire feeder systems.
Figure 1B:
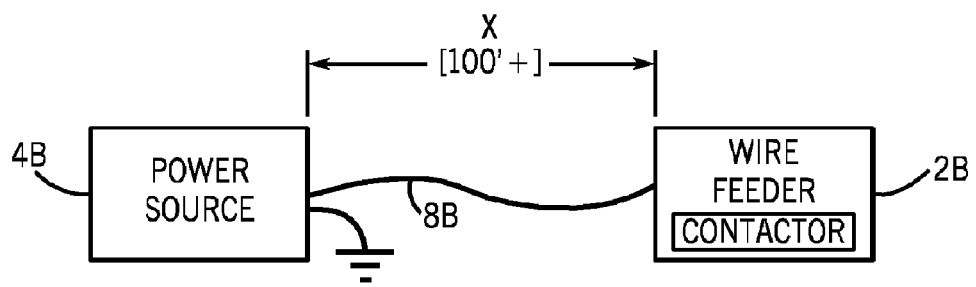
Figure 1C:
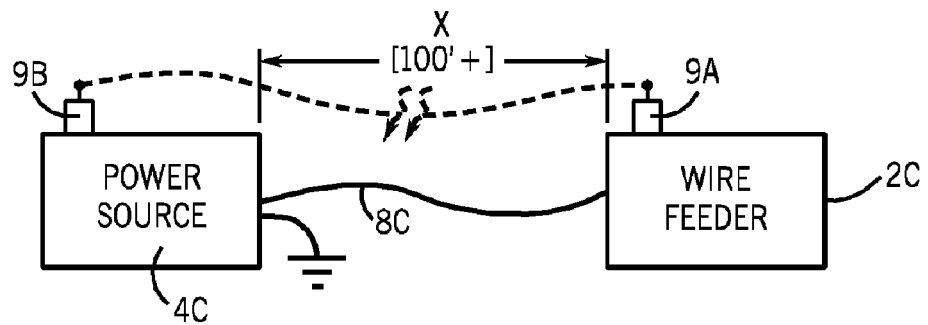
Figure 2:
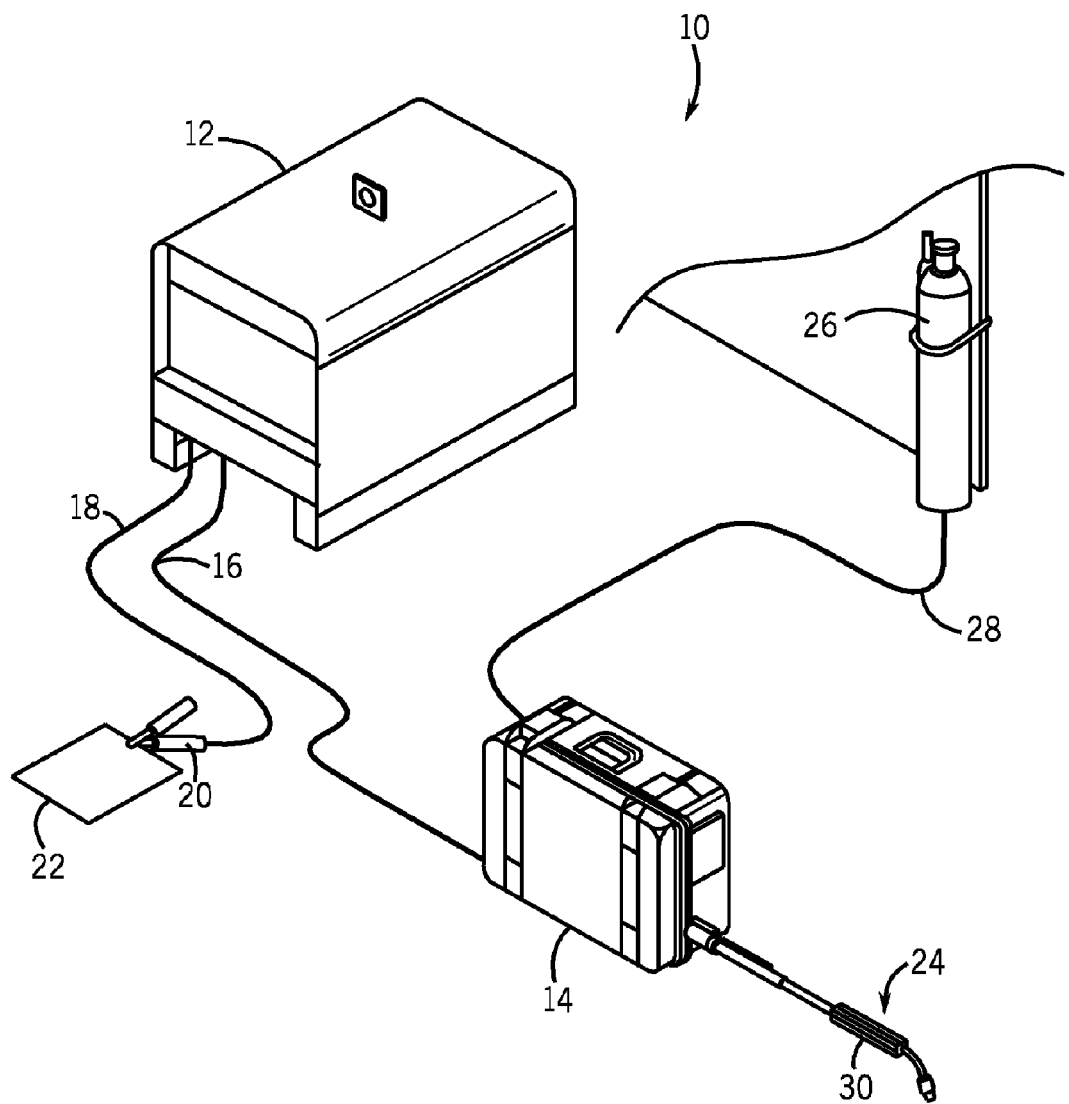
FIG. 2 is a pictorial view of a welding system in accordance with one aspect of the present invention.
Figure 3:
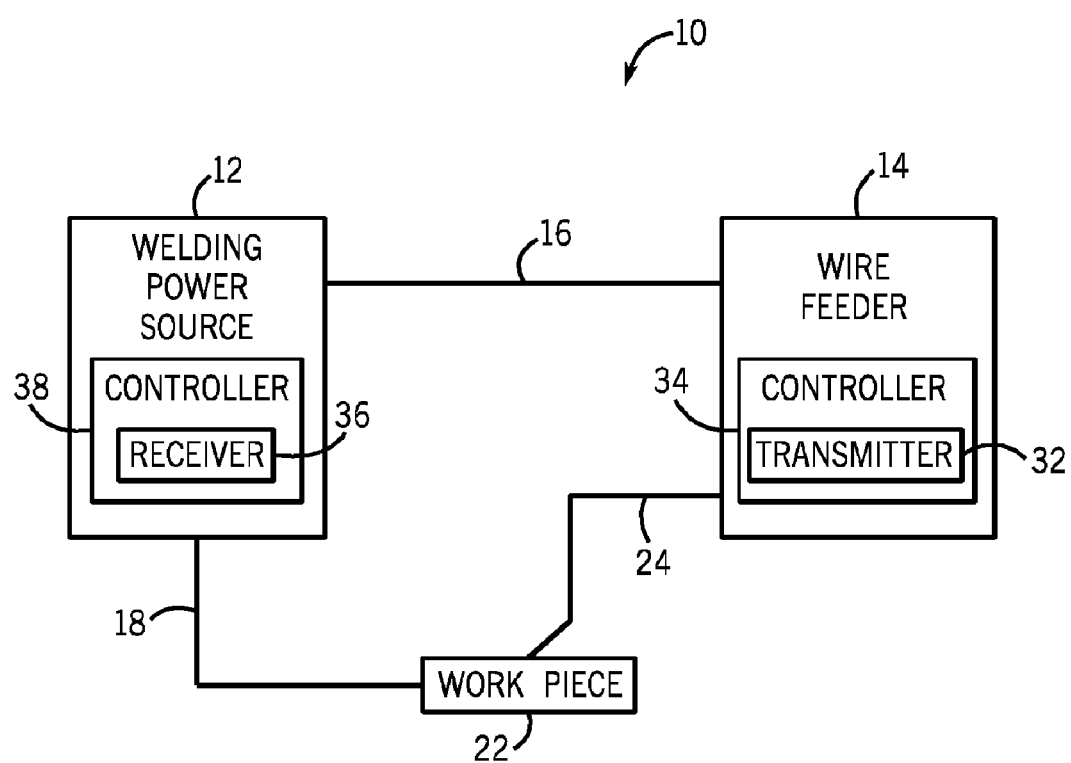
FIG. 3 is a schematic of the welding system illustrated in FIG. 2.

Referring to FIGS. 2 and 3, a MIG welding system 10 includes a welding power source 12 designed to supply power to a wire feeder 14 through a weld cable 16. The power source is designed to run in one of a number of modes including constant voltage (CV) and constant current (CC). Also connected to the power source is a secondary work weld cable 18 that connects the power source to a clamp 20 designed to receive cable 18 to workpiece 22. Also connected to wire feeder 14 is a welding gun or torch 24 configured to supply consumable welding wire to a weld. Welding system 10 may further include a gas cylinder 26 connected to wire feeder 14 such that shielding gas can be provided through gas hose 28 for the MIG welding process.

Power source 12 is designed to condition raw power supplied from a utility line or engine driven power supply and output power usable by the welding process. As such, power source 12 includes one or more transformer assemblies (not shown) to condition the raw power. The output of the power source is generally controlled by a controller and associated operational circuitry that regulates the secondary or output side of the power conditioning components. As such, the power source may be initially powered but not provide a welding output until the secondary power circuit is energized through the closing of a high current DC contactor or other switching assembly. As will be described in greater detail below, power source 12 is regulated such that a secondary or welding power output is not provided until gun 24 is activated signaling commencement of the welding process. In this regard, a welding circuit is not created between power source 12 and workpiece 22 until gun 24 is activated and is placed in relative proximity with workpiece 22.

Torch 24 is equipped with a pushbutton trigger 30 that when depressed causes a transmitter 32 of a controller 34 within wire feeder 14 to transmit command signals to a receiver 36 and power source 12 through weld cable 16. As such, a separate control cord connecting the wire feeder and power source to one another is avoided. Further, as will be described in greater detail below, wire feeder 14 is constructed without a contactor assembly to close the welding circuit. That is, the power necessary for the wire feeder 14 to supply wire to the weld is not always present across weld cables 16 and 18. Accordingly, a separate contactor or switch assembly is not needed in wire feeder 14 to close the welding circuit. The customary open circuit voltage between a power source and a wire feeder is then eliminated because a transmitter disposed within the wire feeder transmits command signals through weld cables 16 and 18 to a receiver 36 disposed within the power source that is designed to communicate with a controller 38 of the power source such that secondary or a welding power output is not provided until the command signal is received from the transmitter 32 in the wire feeder.

This construction has a number of advantages. First, the wire feeder 14 is designed to be a portable or "suitcase" wire feeder such that reduction in weight is clearly advantageous. As such, constructing wire feeder 14 to operate without a separate contactor assembly reduces the overall weight and size of the wire feeder. Furthermore, the contactors required for high current DC applications can be quite expensive thereby increasing the overall cost of the wire feeder. Additionally, the contactor assembly is a maintenance item that may require routine maintenance for continued proper operation. Therefore, constructing wire feeder 14 without such a contactor assembly has a number of size- and cost-associated advantages.

Second, incorporation of a transmitter within wire feeder 14 that communicates with a receiver in power source 12 directly through weld cables 16 and 18 eliminates the need for a separate control/power cable. The control cable adds to the complexity, weight, and overall cost of the welding system. Additionally, as previously noted, the control cord is typically less durable than the welding cables and, as such, is prone to nicks and snags typically associated with industrial locations. Moreover, incorporating the wire feeder without a separate contactor improves the overall current capacity of the wire feeder. That is, the rating of the contactor assembly within the wire feeder generally dictates the ampacity loads of the wire feeder. Removal of the contactor assembly thereby allows the ampacity loads to be governed by other components of the wire feeder which typically have greater maximum ampacity loads than the contactor assembly.

This invention includes both a transmitter and a receiver. The transmitter is designed to operate each time the welding gun/electrode holder trigger is pulled, pressed, or otherwise activated, to start the wire feeder. That is, activation of the trigger causes the wire feeder to supply welding wire to a weld. The transmitter is configured to transmit a signal to the receiver via the welding circuit (electrode and work cables). The signal includes information regarding desired operational parameters of the wire feeder and instructs the receiver to set the magnitude of the output of the welding power source (volts or amperes), the mode of the welding power source (CC or CV), and to energize the output circuit of the welding power source for a predetermined period of time. The transmitter is also configured to repeat a minimum pulse width to provide JOG and PURGE capability. That is, when the JOG button is pushed on the wire feeder, the transmitter automatically repeats the minimum reference command each time the open circuit voltage of the welding power source falls to zero.

Figure 4:
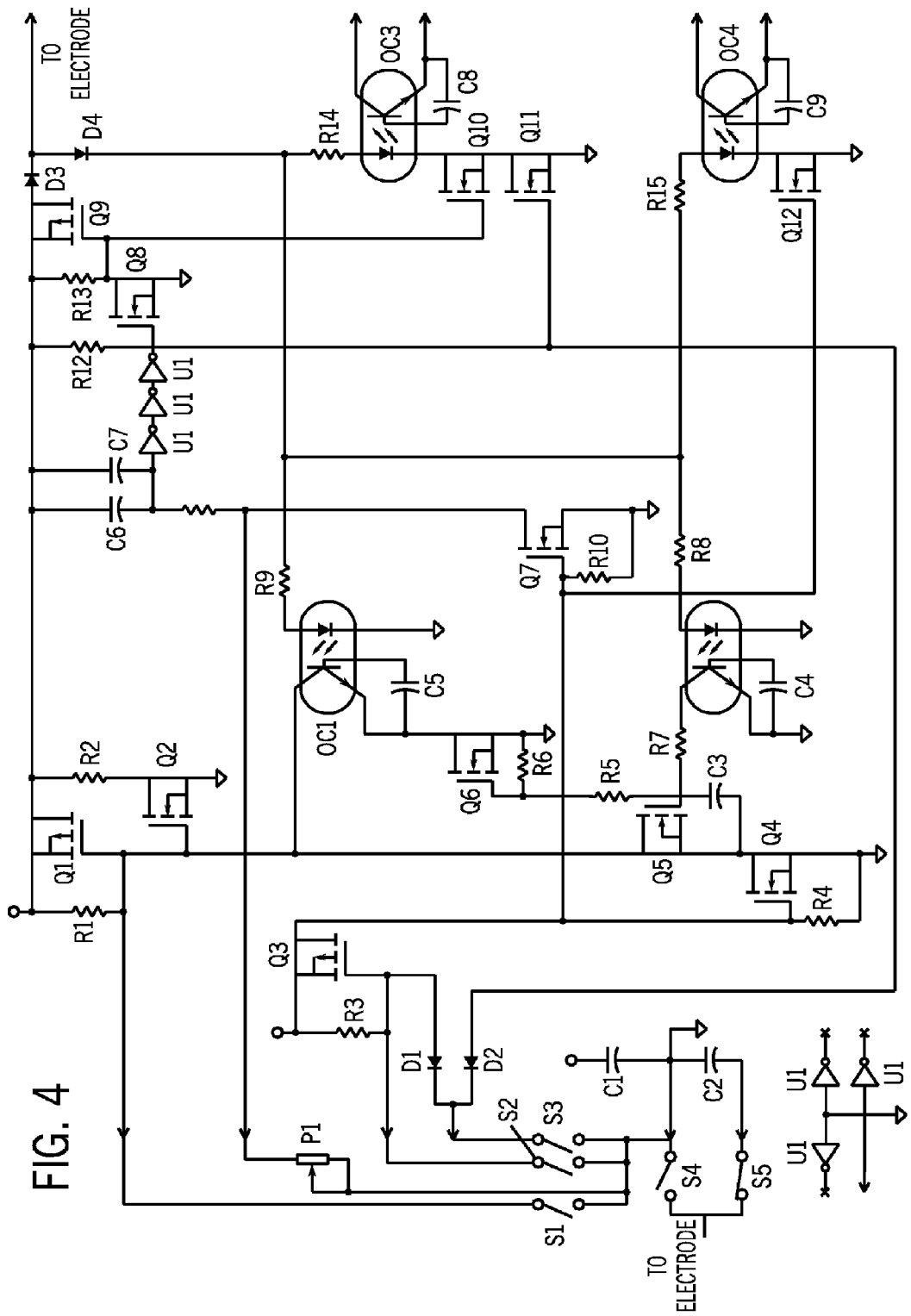
FIG. 4 is a schematic diagram of operational circuitry of a transmitter in accordance with one aspect of the present invention.

The transmitter is designed to produce a substantially rectangular voltage pulse that varies in width, preferably, from approximately 10 milliseconds to 750 milliseconds. The pulse width may be set by a welding machine operator and represents the desired output of the welding power source. The transmitter pulse voltage may also be preset by the operator to one of two or more discrete settings (approximately 9 volts or 18 volts) to command the welding power source output mode (CC or CV). The transmitter produces one pulse each time the welding gun trigger is activated. The time limits of the minimum and maximum transmitted pulse width are established so that the LC time constant of the welding cable inductance and the high frequency bypass capacitors do not degrade the fidelity of the transmitted signal. Further, it is also necessary to complete the data transmission in a short period of time so that the operator does not experience an appreciable delay in the operation of the welding-type system when the wire feeder trigger is activated on the welding gun or torch. The transmitter is also configured to turn the welding wire feeder ON and OFF after the welding circuit is initially energized. When the JOG function is used, the transmitter is configured to automatically repeat the shortest pulse width necessary to energize the output of the power source so the wire feeder can continuously feed wire when changing wire spools. The PURGE control operates in a manner similar to the JOG control by automatically repeating the minimum pulse width. However, during purging, the gas solenoid in the wire feeder is allowed to operate and the motor of the wire feeder is inhibited or prevented from running Referring now to FIG. 4, a circuit illustrating one example of operational circuitry for carrying out the transmission functions heretofore described is shown. When the gun trigger switch S1 is closed, MOSFET Q1 is switched ON, and Q2 is switched OFF. MOSFET Q1 supplies approximately 9 volts to the RC timing circuit including active and passive elements such as capacitors C6 and C7 and inactive element R1, and pulse width control P1. Voltage is also applied to MOSFETs Q9, Q11, and U1. U1 is preferably a CMOS Schmitt-triggered inverter that provides a square waveform to switch MOSFET Q9 ON for a time determined by timing circuit comprising elements C6, C7, R1, and pulse width control P1, to provide the output pulse to the welding circuit. The output pulse is either approximately 8.3 volts (9 volts minus the forward drops of MOSFETs Q1 and Q9 and diode D3) or approximately 17.3 volts (18 volts minus the forward drops of MOSFETs Q1 and Q9 and diode D3) depending on the position of mode select switch S4. When the pulse time is complete, approximately 10 to 750 milliseconds, as set by pulse width control P1, MOSFET Q9 switches OFF, and MOSFET Q10 switches ON. When MOSFET Q10 switches ON, the output of optical coupler OC3 switches to an ON state and the wire feed motor is switched ON. MOSFETs Q10 and Q11 remain in an ON state until the gun trigger switch S1 is released. When switch S1 is released, MOSFET Q1 switches OFF disconnecting the 9 volt supply from the timing and output circuits. MOSFET Q2 switches ON to discharge and reset timing capacitors C6 and C7, MOSFETs Q10 and Q11 switch OFF and optical coupler OC3 switches the wire feed motor OFF.

Mode selector switch S4 selects the pulse voltage. When switch S4 is in the CC (constant current) mode, a single 9 volt battery energizes the transmitter circuit and provides the reference and mode information to the receiver circuit. When switch S4 is in the CV (constant voltage) mode, a second 9 volt battery is connected in series to provide a transmitted pulse of approximately 17.3 volts.

When the JOG switch S2 is closed, MOSFET Q3 is switched ON which turns MOSFETs Q4, Q5, Q6, Q7, and Q12 ON. When MOSFET Q4 switches ON, MOSFET Q1 switches ON and MOSFET Q2 switches OFF. When MOSFET Q7 switches ON, it shortens the transmitted pulse width to a minimum value such as approximately 10 milliseconds. When the short transmitted pulse is complete, the power source output is switched ON and optical couplers OC1, OC2, OC3, and OC4 are switched ON due to the presence of an open circuit voltage via diode D4 and resistors R8, R9, R14, and R15. Optical coupler OC1 holds the welding gun trigger pulled as long as MOSFET Q6 is ON and open circuit voltage is present. Optical coupler OC2 resets timing circuit comprising resistor R5 and capacitor C3 while holding MOSFET Q5 OFF. After approximately 3 seconds, the receiver releases the power source output contactor if no welding current is detected. The absence of open circuit voltage switches optical couplers OC1, OC2, OC3, and OC4 OFF. When optical coupler OC2 releases timing circuit C3 and R5, MOSFET Q5 switches ON repeating the trigger sequence. This results in the continuous feeding of wire for the purpose of replacing the wire spool. When the JOG switch S2 is released, MOSFETs Q3, Q4, Q5, Q6, Q7, and Q12 switch OFF, releasing the wire feeder trigger. MOSFET Q2 switches ON and resets the transmitter timing circuits. When the PURGE switch S3 is closed, the transmitter operates as described in the JOG mode, however, diode D2 holds MOSFET Q11 in an OFF state thereby preventing optical coupler OC3 from switching the wire feeder ON.

If the transmitter is connected to a welding power source that has an output rectifier that uses diodes, the transmitter will only work when connected such that the transmitted pulse reverse biases the output diodes, (the positive polarity of the transmitter must be connected to the positive terminal of the welding power source). If the transmitter is connected with the wrong polarity, the diodes in the output rectifier of the welding power source will be forward biased by the transmitted pulse and shunt the pulse through the transformer secondary winding. If this occurs, the receiver cannot detect the pulse. Therefore, the transmitter circuit includes a two-pole two-throw toggle switch connected to change the polarity connection of the transmitter when the welding polarity connection to the wire feeder is changed.

If the transmitter is connected to the welding circuit with the wrong polarity and the power source secondary contactor control is ON so the welding circuit is energized, diode D3 will be forward biased however the body drain diode (intrinsic diode) in Q9 will block the voltage to protect the transmitter circuit. Diode D5 will be forward biased and optical coupler OC5 will maintain Q9 OFF in the event that the TRIGGER, JOG, or PURGE switches are activated.

The voltage sensing receiver section of the remote control is configured to detect both start and reference commands from the transmitter through the weld cables. The receiver switches ON the secondary power output of the power source and sets the magnitude of the secondary power source output. The receiver includes a current sensing circuit that detects arc current and maintains power source secondary contactor in an ON state while welding. A mode sensing circuit detects a mode command and sets the welding power source output to either a CV or a CC. These aspects of the receiver and an example of operational circuitry are described below.

Figure 5:
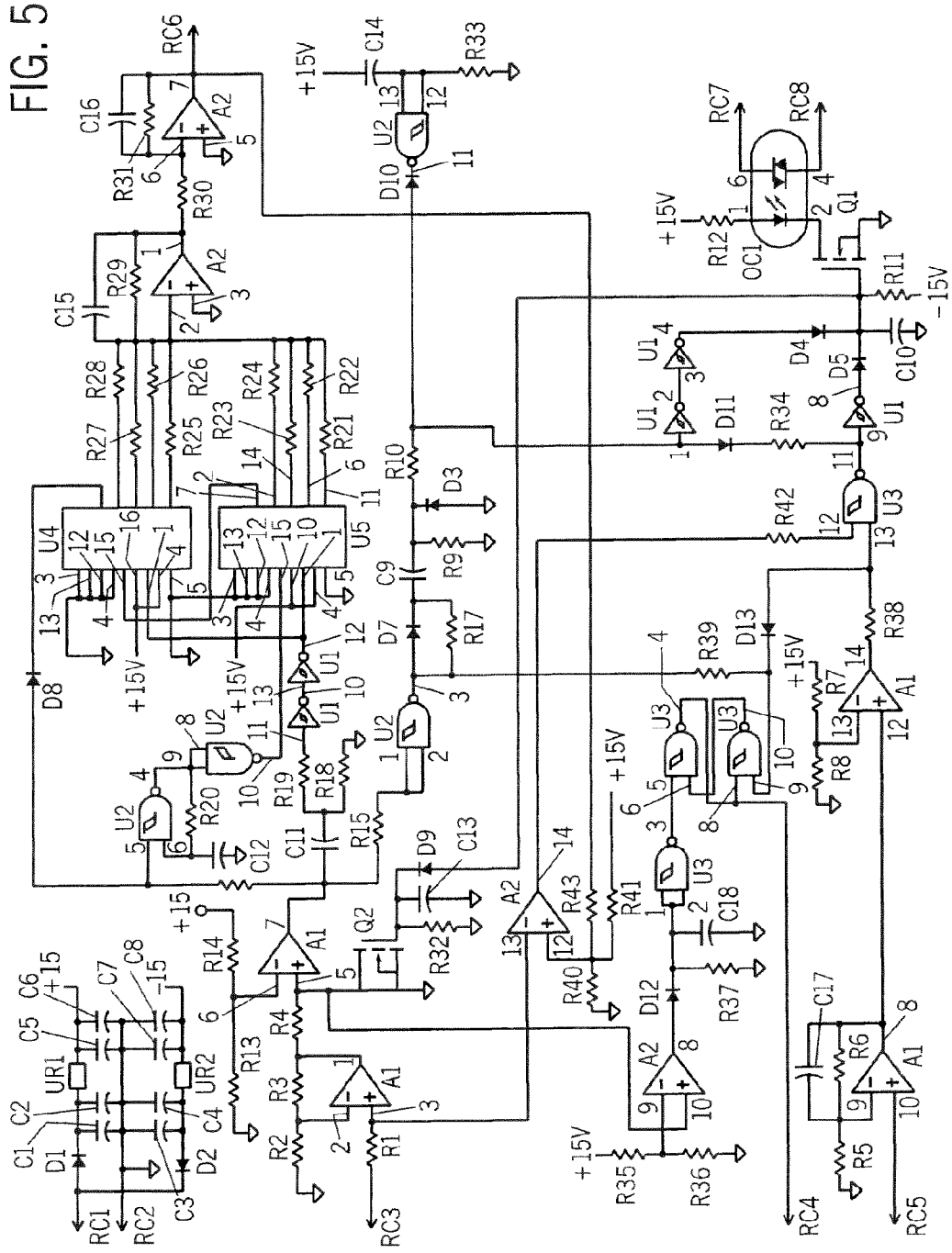
FIG. 5 is a schematic diagram of operational circuitry of a receiver in accordance with one aspect of the present invention.

Referring now to FIG. 5, a voltage feedback signal is present at RC1, pin 3 that is provided the welding power source and represents the voltage present in the welding circuit (electrode to work). The voltage feedback signal is scaled so that 10 volts electrode to workpiece equals a 1 volt feedback signal. When the transmitter sends a pulse of 9 or 18 volts, the input signal at RC1 (pin 3) is 0.9 or 1.8 volts respectively. Amplifier A1 (pins 1, 2, and 3) increases the input signal with a gain of approximately 11. The voltage signal is then applied to voltage comparator A1 (pins 5, 6, and 7). Comparator A1 recognizes any input voltage greater than approximately 6.4 volts (set by bias resistors R13 and R14) as a command pulse from the transmitter, and switches its output from −15 volts to +15 volts for the duration of the transmitted pulse. The positive transition of comparator A1 (pin 7) is coupled through differentiator circuit C11 and R19 to Schmitt-triggered inverters U1 (pins 10 and 11, and 12 and 13). U1 (pin 12) provides a reset pulse to pre-settable cascaded binary counters U4 and U5 that sets the outputs of U4 and U5 to all zeros. Cascaded pre-settable binary counters U4 and U5 are configured to count up when clocked. When A1 (pin 7) switches to +15 volts, blocking oscillator circuit U2 (pins 4, 5, 6, 8, 9, 10, C12, and R20) switches on at approximately 330 Hz. The blocking oscillator indexes cascaded counters U4 and U5 for the duration of the transmitted pulse. Diode D8 provides a blocking oscillator inhibit signal to stop the counters from advancing if the counters reach their maximum binary number of 255 before the transmitted pulse is complete. This prevents the counters from resetting to zero if tolerances in oscillator frequency and transmitter pulse width accumulate so that the counter reaches 255 before the end of the transmitted pulse. The digital output of counters U4 and U5 is converted to an analog voltage signal by resistors R21 through R31 and current summing amplifiers A2 (pins 1, 2, 3, and 5, 6, 7). The analog voltage signal present at A2 (pin 7) is the output reference command for the welding power source.

When the output of comparator A1 (pin 7) switches to +15 volts, the output of NAND gate U2 (pin 3) switches to logic level zero (ground), discharging timing capacitor C9. At the completion of the transmitted pulse, the output of NAND gate U2 (pin 3) switches to +15 volts. The positive transition of NAND gate U2 (pin 3) is coupled through differentiator circuit C9 and R9 to the input of cascaded Schmitt-triggered inverters U1 (pins 1, 2, 3, and 4) that function to buffer and shape the timing pulse from capacitor C9. The output of inverter U1 (pin 4) is coupled through diodes D4 and D9 to switch ON MOSFET transistors Q1 and Q2, respectively. MOSFET Q1 switches ON optical-coupler OC1. The output of optical coupler OC1 switches the welding power source secondary contactor ON for the duration of the timing pulse set by elements C9 and R9 (approximately 3 to 5 seconds). MOSFET transistor Q2 switches ON when the welding power source secondary contactor is energized by optical coupler OC1 to inhibit the voltage sensing circuit comparator A1 (pins 5, 6, and 7) from responding to the voltage present while welding.

Capacitor C14, resistor R33, NAND gate U2 (pins 11, 12, and 13), and diode D10 provide a blanking pulse to the voltage sensing circuit in the receiver when the power source is switched ON. This prevents the receiver from improperly switching ON the power source secondary contactor when the power source is initially switched ON and the logic level power supplies are coming up.

Comparator A2 (pins 12, 13, and 14) provides an enable/inhibit signal to the current sensing circuit. Comparator A2

(pins 12, 13, and 14) compares the voltage feedback signal at RC1 (pin 3) to a bias voltage set by resistors R40, R41, and R43. R43 sets the bias signal as a function of the welding power source output voltage command present at RC1 (pin 6). Comparator A2 (pins 12, 13, and 14) prevents the electrode from melting back to the contact tube in the welding gun when the trigger is released. When the voltage feedback exceeds the bias signal at A2 (pin 12), A2 (pin 14) switches to −15 volts and inhibits the current sense signal at U3 (pin 11).

When the welding power source secondary contactor switches ON, the welding circuit is energized providing voltage to the wire feeder and welding circuit. The wire feeder can operate for the 3 to 5 second period set by timing circuit C9, R9. If during that time, no arc is established, MOSFET transistor Q1 switches OFF and turns OFF the welding power source secondary contactor. Alternatively, if a welding arc is established during the 3 to 5 seconds of initial time, a current feedback signal that is scaled so that 100 amps of welding current equals approximately 1 volt of feedback is present at RC1 (pin 5). Input buffer amplifier A1 (pins 8, 9, and 10) increases the signal amplitude with a gain of approximately 32. The output of current sensing circuit buffer A1 (pin 8) is applied to the input of comparator A1 (pins 12, 13, and 14). Comparator A1 (pins 12, 13, and 14) is biased to switch at approximately 7.5 volts by resistors R7 and R8. The 7.5 volt bias corresponds to approximately 25 amperes of welding current. Therefore, any welding current value greater than 25 amperes will hold the output (pin 14) of comparator A1 at +15 volts. Resistor R38 protects the input to inverter U3 (pin 13) when (pin 14) of A1 is at negative 15 volts. When arc current is greater than 25 amperes and (pin 14) of comparator A2 is positive, (pin 11) of gate U3 switches negative. The output of gate U3 (pin 11) is coupled through resistor R34, diode D11, and resistor R10 to timing capacitor C9 to provide a parallel impedance to timing resistor R9. This reduces the timing pulse from the voltage sensing circuit when arc current greater than 25 amperes is present. The output of gate U3 (pin 11) is also connected to the input of inverter U1 (pin 9). When (pin 14) of comparator A1 switches to +15 volts, (pin 8) of inverter U1 also switches to +15 volts. The output of inverter U1 (pin 8) is coupled to the gate of MOSFET transistor Q1 through diode D5. When MOSFET Q1 switches ON, its output signal is coupled through optical isolator OC1 to switch ON and maintain the secondary contactor in the welding power source in the ON state. Resistor R11 and capacitor C10 provide a brief time delay, (10 to 20 milliseconds) to maintain MOSFET Q1 ON in the event of a brief arc outage while welding.

Referring again to FIG. 5, the receiver circuitry includes a mode sensing circuit. The mode command is established by amplitude modulation. The mode selector switch in the transmitter selects a single 9 volt battery for the CC mode or two series connected 9 volt batteries for the CV mode. Receiver voltage comparator A2 (pins 8, 9, and 10) compares the transmitted voltage pulse from buffer amplifier A1 (pins 1, 2, and 3), to the voltage reference set by bias resistors R35 and R36, approximately 11.75 volts. If the detected pulse is less than 11.75 volts, the output of comparator A2 (pins 8, 9, and 10) is negative 15 volts. Diode D12 blocks the negative voltage at (pin 8) of A2 from the input of NAND gate U3 (pins 1 and 2). Resistor R37 holds the input of gate U3 (pins 1 and 2) at logic level zero (ground) and U3 output (pin 3) is maintained at +15 volts. When the transmitted voltage pulse is being received, the output of gate U2 (pin 3) is at logic level zero. Output (pin 3) of gate U2 is coupled to input (pin 9) of gate U3 through resistor R39. With logic level zero at (pin 9) of gate U3, output (pin 10) of U3 is held at logic level 1 (+15 volts). Output (pin 10) of gate U3 holds input (pin 6) of gate U3 at logic level 1. With both (pins 5 and 6) of gate U3 at logic level 1, output (pin 4) of gate U3 is held at logic level zero. (Pin 4) of gate U3 holds input (pin 8) of gate U3 at logic level zero and maintains U3 (pin 10) at logic level 1. The output (pin 4) of gate U3 also provides a logic level zero to RC1 (pin 4). A logic level zero at RC1 (pin 4) places the welding power source in the CC mode.

If the transmitted pulse voltage is greater than 11.75 volts, comparator A2 (pin 8) switches to +15 volts. This holds input (pins 1 and 2) of gate U3 at logic level 1 and output (pin 3) at logic level zero. The output (pin 3) of gate U3 holds input (pin 5) of gate U3 at logic level zero and output (pin 4) at logic level 1. Output (pin 4) of gate U3 holds input (pin 8) of gate U3 at logic level 1. When the transmitted pulse is complete, output (pin 3) of gate U2 switches to logic level 1 and holds input (pin 9) of gate U3 at logic level 1. With logic level 1 at (pins 8 and 9) of gate U3, output (pin 10) of gate U3 and input (pin 6) of gate U3 are held at logic level zero maintaining logic level 1 on output (pin 4) of gate U3 and RC1 (pin 4). A logic level 1 signal at (pin 4) of RC1 places the welding power source in the CV mode. Timing circuit R37 and C18 maintains the input logic level 1 at (pins 1 and 2) of gate U3 while gate U2 (pin 3) switches to logic level 1 at the completion of the transmitted pulse.

As stated above, the present invention is also applicable with non-MIG welding systems such as TIG and stick welders. Further, the aforedescribed circuitry may be implemented to automatically adjust the output of a power source to compensate for losses that occur across weld cables. That is, in some manufacturing and/or industrial settings, the weld is a relatively great distance from the power source. As such, the weld cables may be dozens to over a hundred feet in length. This weld cable length results in losses from the output terminal of the power source to the weld. Simply, the voltage at the output terminals of the power source (where the weld cable is connected to the power source) may be significantly more than the voltage across the weld. Accordingly, the present invention may be used to transmit a voltage feedback signal at the weld to the power source whereupon a controller in the power source compares the voltage at the terminal to the voltage at the weld and adjusts the voltage at the terminal such that after the losses experienced across the weld cables, the voltage at the weld is at the level requested by the user.

Therefore, in accordance with one embodiment of the present invention, a welding system includes a power source having a controller to regulate welding operation. An electrode holder having a trigger is configured to hold an electrode in relative proximity to a workpiece such that a welding arc is created between the electrode and the workpiece. The system also includes a transmitter configured to detect activation of the trigger and, responsive thereto, transmit a signal indicative of desired welding operation through weld cables. A receiver is provided remotely from the transmitter and is configured to receive the signal and instruct the controller of the power source according to the desired welding operation.

In accordance with another embodiment of the present invention, a welding system includes a power source configured to condition raw power and supply a power usable during a welding process. A wire feeder is configured to receive the power from the power source and supply a consumable electrode to a weld. The wire feeder includes a torch connected thereto and a transmitter configured to detect activation of the torch and transmit a signal to a receiver of the power source indicating activation of the torch. The welding system further includes a welding cable connecting the power source and the wire feeder to one another such that the signal is transmittable thereacross from the transmitter to the receiver. The system is constructed such that a voltage is not created across the weld cable until the transmitter transmits a signal to the receiver signaling that the torch has been activated.

According to another embodiment of the present invention, a method of remotely controlling a power source for a welder includes the step of detecting activation of a triggering mechanism of a welding-type torch to initiate a welding-type process. The method further includes the step of transmitting a signal indicative of desired operational parameters of the power source through weld cables connected to the power source and a workpiece, automatically upon activation of the triggering mechanism. The transmitted signal is then received remotely from the triggering mechanism whereupon the power source is controlled in accordance with data embodied in the signal transmitted through the weld cables.

In accordance with yet a further embodiment of the present invention, a kit to retrofit a welder and wire feeder system is provided. The kit includes a transmitter to be disposed within a wire feeder and configured to detect activation of a welding torch. The kit also includes a receiver to be disposed within a power source and electrically connected to the transmitter through the weld cables. A controller is provided to regulate operation of the power source such than an open circuit voltage is not created across the weld cables until an energized secondary voltage command signal is received by the receiver from the transmitter.

The present invention has been described in terms of the preferred embodiment, and it is recognized that equivalents, alternatives, and modifications, aside from those expressly stated, are possible and within the scope of the appending claims.

What is claimed is:

1. A welding system comprising:
   a power source having a controller to regulate welding operation;
   an electrode holder configured to hold a consumable wire in relative proximity to a workpiece such that a welding arc is created between the consumable wire and the workpiece;
   a wire feeder connecting the power source to the electrode holder and constructed to deliver welding-type power from the power source to the electrode holder, wherein an open circuit voltage is not created between the power source and the electrode holder when a welding arc is not present between the consumable wire and the workpiece; and
   a transmitter positioned in proximity to the wire feeder and configured to transmit a signal indicative of a desired welding operation.

2. The welding system of claim 1 comprising a receiver remote from the transmitter and configured to receive the signal and instruct the controller to regulate the power source according to the desired welding operation.

3. The welding system of claim 1 wherein the transmitter is configured to transmit the signal through a weld cable connected between the power source and the wire feeder.

4. The welding system of claim 1 wherein the transmitter is configured to transmit the signal wirelessly.

5. The welding system of claim 4 wherein the transmitter is configured to transmit the signal via radio frequency signals.

6. The welding system of claim 1 wherein the desired welding operation includes at least one of a magnitude of power source output and a power source mode.

7. The welding system of claim 6 wherein the desired welding operation includes the power source mode, and the power source mode includes one of constant current and constant voltage.

8. The welding system of claim 1 wherein the transmitter is configured to produce a substantially rectangular voltage pulse of variable width.

9. The welding system of claim 8 wherein a width of the pulse is indicative of desired output of the power source.

10. The welding system of claim 8 wherein the transmitter is configured to transmit the signal within a range of approximately 1.3 Hz to 100 Hz.

11. The welding system of claim 1 wherein the power source is configured to provide power for at least one of a MIG welding process, a TIG welding process, a flux cored welding process, a stick welding process, a submerged arc welding process, and a gouging process.

12. A welding system comprising:
    a power source configured to condition raw power and supply power usable during a welding process;
    a wire feeder configured to receive the power from the power source and supply a consumable electrode to a weld, the wire feeder having a transmitter configured to transmit a signal to a receiver of the power source indicative of desired operational parameters of the power source;
    a torch connected to the wire feeder and configured to receive the power from the wire feeder; and
    a welding cable connecting the power source and the wire feeder such that the signal is transmittable between the transmitter and the receiver, wherein the power source and the wire feeder are connected such that a welding-type voltage is not created across the welding cable until the transmitter transmits a signal to the receiver signaling the desired operational parameters.

13. The welding system of claim 12 comprising a pushbutton trigger mounted to the torch, wherein the wire feeder is configured to detect activation of the pushbutton trigger and transmit the signal in response thereto.

14. The welding system of claim 12 wherein the power source provides a non-welding power to the wire feeder to power electronics of the wire feeder during non-welding intervals.

15. The welding system of claim 12 wherein the desired operational parameters include at least one of power source output magnitude, power source welding mode, purging, and jogging.

16. The welding system of claim 12 wherein the wire feeder is a portable suitcase wire feeder.

17. A welding system comprising:
    a power source having a power source contactor configured to supply welding-type power to a weld when the power source contactor is in a closed position;
    a welding gun configured to supply consumable welding wire to the weld;
    a wire feeder connected to the power source and connected to the welding gun, wherein the wire feeder is configured to receive the welding-type power from the power source and to deliver the welding-type power to the welding gun; and
    a communication system configured to detect activation of the welding gun and to close the power source contactor in response thereto, wherein an open circuit voltage is created between the power source and the welding gun only when a welding arc is present between the consumable welding wire and the weld.

18. The welding system of claim 17 wherein the communication system comprises:
- a transmitter located adjacent to the wire feeder and configured to transmit a signal upon activation of the welding gun; and
- a receiver located adjacent to the power source and configured to receive the signal and close the power source contactor in response to the received signal.

19. The welding system of claim 18 comprising a welding cable connecting the wire feeder to the power source, wherein the transmitter is configured to transmit the signal across the welding cable.

20. The welding system of claim 18 wherein the transmitter is configured to transmit the signal wirelessly to the receiver.

* * * * *